US010404437B2

(12) United States Patent
Astely et al.

(10) Patent No.: US 10,404,437 B2
(45) Date of Patent: Sep. 3, 2019

(54) PUCCH RESOURCE ALLOCATION FOR CARRIER AGGREGATION IN LTE-ADVANCED

(71) Applicant: Telefonaktiebolaget LM Ericsson (publ), Stockholm (SE)

(72) Inventors: David Astely, Bromma (SE); Robert Baldemair, Solna (SE); Dirk Gerstenberger, Stockholm (SE); Daniel Larsson, Stockholm (SE); Lars Lindbom, Karlstad (SE); Stefan Parkvall, Bromma (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 3 days.

(21) Appl. No.: 15/824,421

(22) Filed: Nov. 28, 2017

(65) Prior Publication Data
US 2018/0123762 A1 May 3, 2018

Related U.S. Application Data

(63) Continuation of application No. 15/350,360, filed on Nov. 14, 2016, now Pat. No. 9,860,044, which is a
(Continued)

(51) Int. Cl.
*H04B 7/00* (2006.01)
*H04L 5/00* (2006.01)
(Continued)

(52) U.S. Cl.
CPC ............ *H04L 5/0053* (2013.01); *H04L 5/001* (2013.01); *H04L 5/0094* (2013.01); *H04W 28/26* (2013.01);
(Continued)

(58) Field of Classification Search
CPC . H04W 88/08; H04W 72/044; H04W 72/042; H04W 52/367; H04W 52/12;
(Continued)

(56) References Cited

U.S. PATENT DOCUMENTS 8,194,603 B2 * 6/2012 Nimbalker .............. H04L 5/001
370/329
8,265,030 B2 * 9/2012 Miki .................. H04W 72/1257
370/330
(Continued)

FOREIGN PATENT DOCUMENTS

CN 101765208 A 6/2010
WO 2009022474 A1 2/2009

OTHER PUBLICATIONS

3GPP TSG RAN WG1 Meeting #58bis, Ericsson, St-Ericsson, PUCCH transmission for Carrier Aggregation, Oct. 12-16, 2009, Miyazaki, Japan (R1-094273).
(Continued)

*Primary Examiner* — Md K Talukder
(74) *Attorney, Agent, or Firm* — Coats & Bennett, PLLC

(57) ABSTRACT

Systems and methods of signaling uplink control information in a mobile communication network using carrier aggregation are provided. In one exemplary embodiment, a method may include scheduling downlink transmissions to a first user terminal on a single downlink component carrier (CC) associated with a primary cell and scheduling downlink transmissions to a second user terminal on multiple downlink CCs or on a downlink CC associated with a non-primary cell. Further, the method may include receiving, on a first set of radio resources, control information associated with the downlink transmissions to the first user terminal. In addition, the method may include receiving, on a second set of radio resources, control information associ-
(Continued)

ated with the downlink transmissions to the second user terminal.

14 Claims, 12 Drawing Sheets

Related U.S. Application Data continuation of application No. 12/896,993, filed on Oct. 4, 2010, now Pat. No. 9,497,004.

(60) Provisional application No. 61/248,661, filed on Oct. 5, 2009.

(51) Int. Cl.
| | |
|---|---|
| H04W 28/26 | (2009.01) |
| H04W 72/04 | (2009.01) |
| H04W 72/12 | (2009.01) |
| H04W 8/24 | (2009.01) |
| H04W 48/16 | (2009.01) |
| H04W 88/02 | (2009.01) |
| H04W 88/08 | (2009.01) |

(52) U.S. Cl.
CPC ... *H04W 72/0453* (2013.01); *H04W 72/1273* (2013.01); *H04L 5/0005* (2013.01); *H04W 8/24* (2013.01); *H04W 48/16* (2013.01); *H04W 88/02* (2013.01); *H04W 88/08* (2013.01)

(58) Field of Classification Search
CPC .............. H04W 52/40; H04L 29/08657; G01S 5/0252; G01S 5/02; H04B 1/3833; H04M 1/0247; H04M 1/0237
See application file for complete search history.

(56) References Cited

U.S. PATENT DOCUMENTS

| | | | | |
|---|---|---|---|---|
| 8,447,343 | B2* | 5/2013 | Gerstenberger | H04W 52/10 455/522 |
| 8,472,368 | B2* | 6/2013 | Baldemair | H04L 5/0053 370/318 |
| 8,634,358 | B2* | 1/2014 | Damnjanovic | H04L 1/1861 370/329 |
| 8,792,830 | B2* | 7/2014 | Lim | H04L 25/02 375/260 |
| 2002/0160784 | A1 | 10/2002 | Kuwahara | H04W 28/26 455/452.1 |
| 2010/0003997 | A1* | 1/2010 | Koyanagi | H04L 1/0003 455/450 |
| 2010/0098012 | A1* | 4/2010 | Bala | H04L 5/001 370/329 |
| 2010/0208679 | A1* | 8/2010 | Papasakellariou | H04L 1/1614 370/329 |
| 2010/0232373 | A1* | 9/2010 | Nory | H04W 72/1289 370/329 |
| 2010/0271970 | A1* | 10/2010 | Pan | H04L 1/0026 370/252 |
| 2010/0285809 | A1* | 11/2010 | Lindstrom | H04L 5/001 455/450 |
| 2010/0296389 | A1* | 11/2010 | Khandekar | H04L 5/0007 370/216 |
| 2010/0322173 | A1* | 12/2010 | Marinier | H04L 5/001 370/329 |
| 2011/0007695 | A1* | 1/2011 | Choi | H04L 5/0007 370/329 |
| 2011/0007699 | A1* | 1/2011 | Moon | H04L 5/0053 370/329 |
| 2011/0081913 | A1* | 4/2011 | Lee | H04L 5/003 455/450 |
| 2011/0081932 | A1* | 4/2011 | Astely | H04L 5/001 455/509 |
| 2011/0243039 | A1* | 10/2011 | Papasakellariou | H04L 1/1861 370/280 |
| 2011/0310856 | A1* | 12/2011 | Hariharan | H04L 1/1607 370/336 |
| 2012/0020317 | A1* | 1/2012 | Ishii | H04L 1/1854 370/329 |
| 2012/0051306 | A1* | 3/2012 | Chung | H04L 1/1893 370/329 |
| 2012/0082125 | A1* | 4/2012 | Huang | H04L 5/0007 370/329 |
| 2012/0140708 | A1* | 6/2012 | Choudhury | H04W 72/082 370/328 |
| 2012/0147847 | A1 | 6/2012 | Matsumoto et al. | |
| 2012/0314675 | A1* | 12/2012 | Vujcic | H04L 5/001 370/329 |
| 2013/0003700 | A1* | 1/2013 | Zhang | H04W 76/19 370/331 |
| 2013/0010721 | A1* | 1/2013 | Alba | H04L 1/1812 370/329 |
| 2013/0034073 | A1* | 2/2013 | Aiba | H04L 1/0026 370/329 |
| 2013/0136084 | A1* | 5/2013 | Zhang | H04W 72/0413 370/329 |
| 2014/0078941 | A1* | 3/2014 | Seo | H04L 1/1822 370/280 |

OTHER PUBLICATIONS

3rd Generation Partnership Project, Motorola (source), "Control Signalling Design for Supporting Carrier Aggregation," 3GPP TSG RAN1 #56, R1-090792, Athens, GR, Feb. 9-13, 2009, pp. 1-8.
3rd Generation Partnership Project, ZTE (source), "Uplink Control Channel Design for LTE-Advanced," TSG-RAN WG1 #58, R1-093209, Shenzhen, China, Jun. 25-Aug. 29, 2009, pp. 1-4.
3rd Generation Partnership Project, Nokia, Nokia Siemens Networks (source), "L1 Control Signaling with Carrier Aggregation in LTE-Advanced," 3GPP TSG-RAN WG1 Meeting #54bis, R1-083730, Prague, Czech Republic, Sep. 29-Oct. 3, 2008, pp. 1-6.
3rd Generation Partnership Project, Nokia Siemens Networks, Nokia (source), "Channelization of SRI and Persistent ACK/NACK on PUCCH," 3GPP TSG RAN WG1 Meeting #52bis, R1-081460, Shenzhen, China, Mar. 31-Apr. 4, 2008, pp. 1-5.
3rd Generation Partnership Project, Qualcomm Europe, "Clarifying PUSCH Resource Allocation," 3GPP TSG-RAN WG1 Meeting #54, R1-083181, Jeju, Korea, Aug. 18-22, 2008, pp. 1-5.
NTT Docomo, Inc., "UL Layered Control Signal Structure in LTE-Advanced", 3GPP Draft RAN WG1 Meeting #54bis; RI-083679 UL Layered Control Signal, 3rd Generation Partnership Project (3GPP), Mobile Competence Centre ; 650, Route Des Lucioles ; F-06921 Sophia-Antipolis Cedex ; France, vol. Ran WG1, No. Prague, Czech Republic; Sep. 29, 2008-Oct. 3, 2008, Sep. 29, 2008 (Sep. 29, 2008), XP050597042, [retrieved on Sep. 24, 2008], pp. 1-14.
ZTE (source), "ACK/NACK Design for LTE-Advanced," TSG-RAN WG1 #58bis, R1-093821, Miyazaki, Japan, Oct. 12-16, 2009, pp. 1-9.
Infineon Technologies (source), "Clarification of UL DPCCH slot format information usage in IE 'DTX-DRX Information',"3GPP TSG-RAN WG2 Meeting #65, Tdoc R2-091165, Athens, Greece Feb. 9-13, 2009, pp. 1-2.
NTT DocCoMo, Inc. (source), "UL ACK/NACK resource allocation for DL semi-persistent scheduling," 3GPP TSG RAN WG2 #62, R2-082485 (resubmission of R2-081857), Kansas City, Missouri, USA, May 5-9, 2008, pp. 1-4.
Texas Instruments, "Dynamic ACK/NAK Channelization on PUCCH," 3GPP TSG RAN WG1 #52bis, R1-081375, Shenzhen, China, Mar. 31-Apr. 4, 2008, pp. 1-4.
Huawei, "PUCCH design for carrier aggregation," 3GPP TSG RAN WG1 Meeting #58, R1-093046, Shenzhen, China, Aug. 24-28, 2009, pp. 1-8.
Huawei, PCCH design for carrier aggregation, 3GPP TSG RAN WG1 Meeting #56, Athens, Greece, Feb. 9-13, 2009, R1-090813.

(56) References Cited

OTHER PUBLICATIONS

CMCC, UL ACK/NACK and CI feedback in Carrier Aggregation, 3GPP TSG RAN WG1 meeting #58, Shenzhen, China, Aug. 24-28, 2009, R1-093269.
3rd Generation Partnership Project, "Technical Specification Group Radio Access Network; Evolved Universal Terrestrial Radio Access (E-UTRA); Physical layer procedures (Release 8)", 3GPP TS 36.213 V8.8.0, Sep. 1, 2009, pp. 1-77, 3GPP, France.
3rd Generation Partnership Project, Technical Specification Group Radio Access Network; Evolved Universal Terrestrial Radio Access (E-UTRA) Radio Resource Control (RRC); Protocol specification (Release 8), 3GPP TS 36.331 V8.6.0, Jun. 1, 2009, pp. 1-207, 3GPP, France.
Nokia, Nokia Siemens Networks, L1 control signaling with carrier aggregation in LTD-Advanced, 3GPP TSG-RAN WG1 Meeting #54bis, Prague, Czech Republic, Sep. 29-Oct. 3, 2008, R1-083730.
NTT Docomo, Inc., UL Layered Control Signal Structure in LTE-Advanced, 3GPP TSG RAN WG1 Meeting #54bis, Prague, Czech Republic, Sep. 29-Oct. 3, 2008, R1-083679.

\* cited by examiner

PUCCH RESOURCE ALLOCATION FOR CARRIER AGGREGATION IN LTE-ADVANCED

RELATED APPLICATION

This application is a continuation of U.S. patent application Ser. No. 15/350,360 filed Nov. 14, 2016 which is a continuation of U.S. patent application Ser. No. 12/896,993, filed Oct. 4, 2010, now U.S. Pat. No. 9,497,004, issued Nov. 15, 2016, claiming the benefit of U.S. Provisional Patent Application 61/248,661, filed Oct. 5, 2009, the disclosures of all of which are incorporated by reference herein in their entirety.

TECHNICAL FIELD

The present invention relates generally to carrier aggregation in a mobile communication system and, more particularly, to an efficient resource allocation for the physical uplink control channel for carrier aggregation.

BACKGROUND

Carrier aggregation is one of the new features being discussed for the next generation of Long Term Evolution (LTE) systems, which is being standardized as part of LTE Release 10 (known as LTE-Advanced). LTE Rel 8 currently supports bandwidths up to 20 MHz. In LTE-Advanced, bandwidths up to 100 MHz will be supported. The very high data rates contemplated for LTE-Advanced will require an expansion of the transmission bandwidth. In order to maintain backward compatibility with LTE Rel-8 user terminals, the available spectrum is divided into Rel-8 compatible chunks called component carriers. Carrier aggregation enables the needed bandwidth expansion by allowing user terminals to transmit data over multiple component carriers comprising up to 100 MHz of spectrum. Carrier aggregation also ensures efficient use of a wide carrier for legacy terminals by making it possible for legacy terminals to be scheduled in all parts of the wideband LTE-Advanced carrier.

The number of aggregated component carriers, as well as the bandwidth of the individual component carrier, may be different for Uplink (UL) and Downlink (DL). A symmetric configuration refers to the case where the number of component carriers in downlink and uplink is the same. An asymmetric configuration refers to the case where the number of component carriers is different. The number of component carriers configured for a geographic cell area may be different from the number of component carriers seen by a terminal. A user terminal, for example, may support more downlink component carriers than uplink component carriers, even though in the geographic cell area the same number of uplink and downlink component carriers is offered by the network.

One consideration for carrier aggregation is how to transmit control signaling from the user terminal on the uplink from the user terminal. Uplink control signaling may include acknowledgement (ACK) signaling for hybrid automatic repeat request (HARQ) protocols, channel state and quality information (CSI, CQI) reporting for downlink scheduling, and scheduling requests (SRs) indicating that the user terminal needs uplink resources for uplink data transmissions. One solution is to transmit the uplink control information on multiple uplink component carriers associated with different downlink component carriers. However, this option is likely to result in higher user terminal power consumption and a dependency on specific user terminal capabilities. It may also create implementation issues due to inter-modulation products, and may lead to generally higher complexity for implementation and testing.

SUMMARY

The invention provides a signaling mechanism for efficient transmission of control information in a communication system using carrier aggregation. The signaling mechanism allows the transmission, on a single uplink component carrier, of control information associated with downlink transmissions on multiple aggregated downlink component carriers. Semi-statically reserved resources for the transmission of control information on the uplink component carrier may be dynamically shared by user terminals that are assigned multiple downlink component carriers for downlink transmissions. Implicit or explicit resource indication can be used in combination with dynamic resource indication.

One exemplary embodiment of the invention comprises a method implemented by a base station of receiving control information from user terminals. The method comprises scheduling downlink transmissions to said user terminal on one or more downlink component carriers; if the user terminal is scheduled to receive downlink transmissions on a first single downlink component carrier, receiving control information associated with the downlink transmissions to the user terminal on a first set of radio resources on a uplink primary component carrier associated with said first downlink component carrier; and if the user terminal is scheduled to receive downlink transmissions on a second single downlink component carrier or multiple downlink component carriers, receiving control information associated with the downlink transmissions to the user terminal on a second set of radio resources on the uplink primary component carrier.

Another exemplary embodiment of the invention comprises a base station for transmitting data to one or more user terminals. The base station comprises a transmitter to transmit user data on one or more downlink component carriers to a user terminal; and a controller to schedule downlink transmissions to the user terminal. The controller is configured to schedule downlink transmissions to the user terminal on one or more downlink component carriers; if the user terminal is scheduled to receive downlink transmissions on a first single downlink component carrier, receive control information associated with the downlink transmissions to the user terminal on a first set of radio resources on a uplink primary component carrier associated with said first downlink component carrier; and, if the user terminal is scheduled to receive downlink transmissions on a second single downlink component carrier or multiple downlink component carriers, receive control information associated with the downlink transmissions to the user terminal on a second set of radio resources on the uplink primary component carrier.

Another exemplary embodiment of the invention comprises a method of transmitting control information implemented by a user terminal in a mobile communication network. The method comprises receiving an assignment of radio resources for downlink transmissions from a base station; transmitting control information associated with the downlink transmissions on a first set of radio resources on an uplink component carrier if an assignment of single downlink component carrier for the downlink transmission is received; and transmitting control information associated with the downlink transmissions on a second set of radio resources on the uplink component carrier if an assignment of multiple downlink component carriers for the downlink transmission is received.

Another exemplary embodiment of the invention comprises a user terminal configured to send control information associated with downlink transmissions on one or more downlink component carriers. The user terminal comprises a receiver to receive downlink transmissions from a base station; a transmitter to transmit control information associated with the downlink transmission to a base station; and a controller to select radio resources for transmission of control information associated with the downlink transmissions. The controller is configured to select a first set of radio resources on an uplink component carrier if an assignment of a single downlink component carrier for the downlink transmission is received; and select a second set of radio resources on the uplink component carrier if an assignment of multiple downlink component carriers for the downlink transmission is received.

Another exemplary embodiment of the invention comprises an alternate method of transmitting control information implemented by a user terminal in a mobile communication network. The method comprises receiving an assignment of radio resources for a downlink transmissions from a base station; transmitting control information associated with the downlink transmission on a first set of radio resources on an uplink component carrier if an assignment of a first downlink component carrier for the downlink transmission is received; and transmitting control information associated with the downlink transmission on a second set of radio resources on the uplink component carrier if an assignment of a second downlink component carrier for the downlink transmission is received.

Another exemplary embodiment of the invention comprises a user terminal configured to send control information associated with downlink transmissions on one or more downlink component carriers. The user terminal comprises a receiver to receive downlink transmissions from a base station; a transmitter to transmit control information associated with the downlink transmission to a base station; and a controller to select radio resources for transmission of control information associated with the downlink transmission. The controller is configured to select a first set of radio resources on an uplink component carrier if an assignment of a first downlink component carrier for the downlink transmission is received; and select a second set of radio resources on the uplink component carrier if an assignment of a second downlink component carrier for the downlink transmission is received.

DETAILED DESCRIPTION

Figure 1:
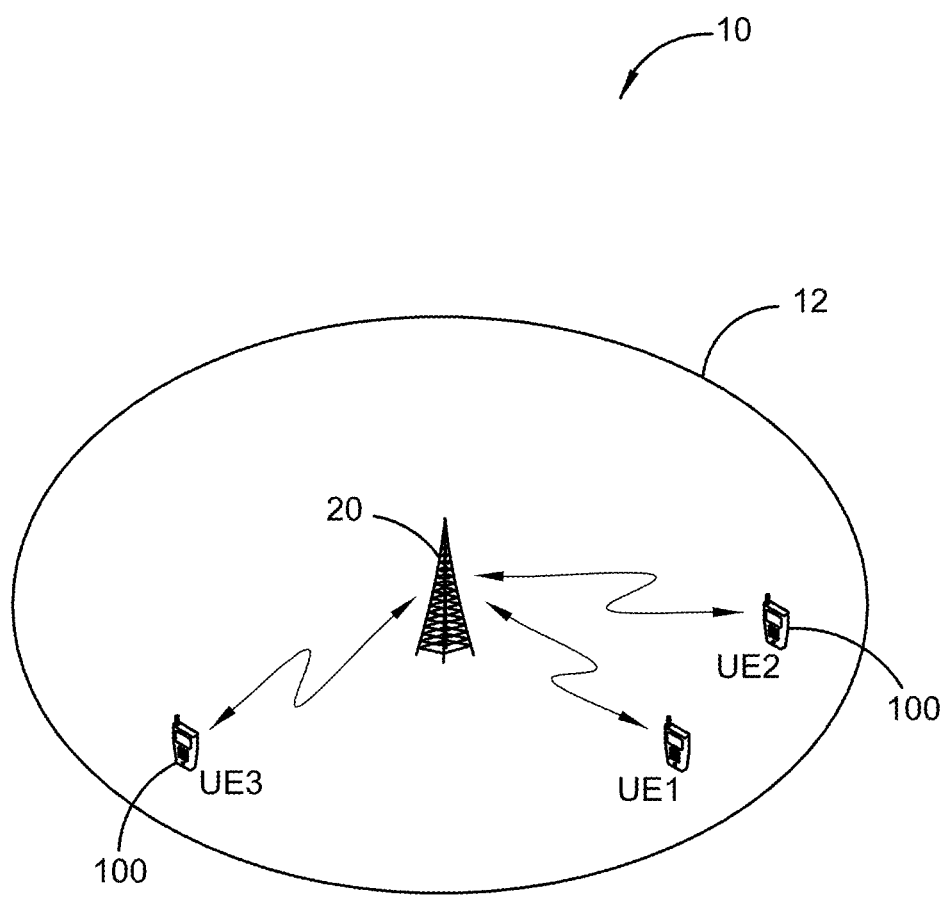
FIG. 1 illustrates an exemplary OFDM communication system.

Referring now to the drawings, FIG. 1 illustrates an exemplary mobile communication network 10 for providing wireless communication services to user terminals 100. Three user terminals 100 are shown in FIG. 1. The user terminals 100 may comprise, for example, cellular telephones, personal digital assistants, smart phones, laptop computers, handheld computers, or other devices with wireless communication capabilities. The mobile communication network 10 comprises a plurality of geographic cell areas or sectors 12. Each geographic cell area or sector 12 is served by a base station 20, which is referred to in LTE as a NodeB or Enhanced NodeB (eNodeB). A single base station 20 may provide service in multiple geographic cell areas or sectors 12. The user terminals 100 receive signals from a serving base station 20 on one or more downlink (DL) channels, and transmit signals to the base station 20 on one or more uplink (UL) channels.

For illustrative purposes, an exemplary embodiment of the present invention will be described in the context of a Long-Term Evolution (LTE) system. Those skilled in the art will appreciate, however, that the present invention is more generally applicable to other wireless communication systems, including Wideband Code-Division Multiple Access (WCDMA) and WiMax (IEEE 802.16) systems.

Figure 2:
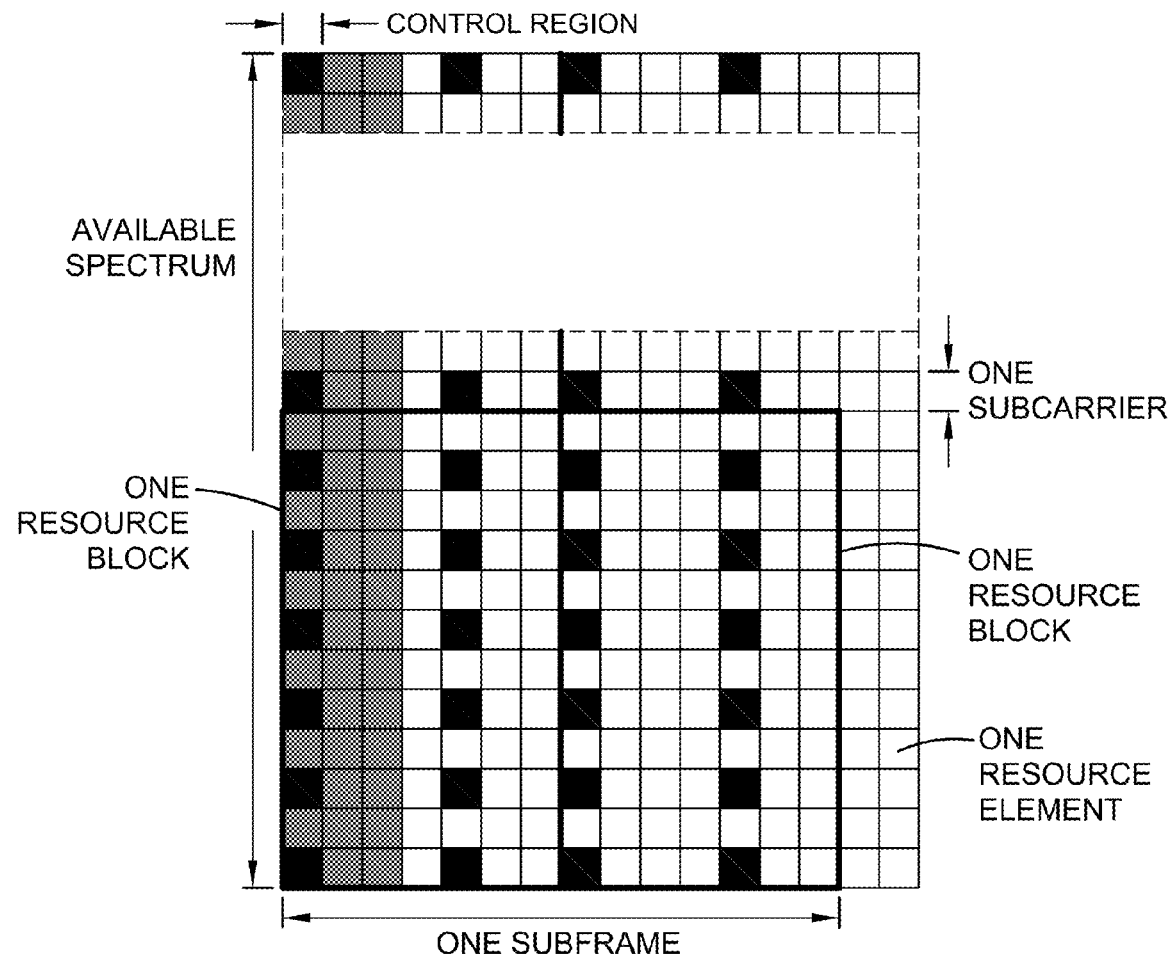
FIG. 2 illustrates an exemplary time-frequency grid for an OFDM system.

LTE uses Orthogonal Frequency Division Multiplexing (OFDM) in the downlink and Discrete Fourier Transform (DFT) spread OFDM in the uplink. The basic LTE downlink physical resource can be viewed as a time-frequency grid. FIG. 2 illustrates a portion of an exemplary OFDM time-frequency grid 50 for LTE. Generally speaking, the time-frequency grid 50 is divided into one millisecond subframes. Each subframe includes a number of OFDM symbols. For a normal cyclic prefix (CP) length, suitable for use in situations where multipath dispersion is not expected to be extremely severe, a subframe comprises fourteen OFDM symbols. A subframe comprises twelve OFDM symbols if an extended cyclic prefix is used. In the frequency domain, the physical resources are divided into adjacent subcarriers with a spacing of 15 kHz. The number of subcarriers varies according to the allocated system bandwidth. The smallest element of the time-frequency grid 50 is a resource element. A resource element comprises one OFDM subcarrier during one OFDM symbol interval.

Figure 3:
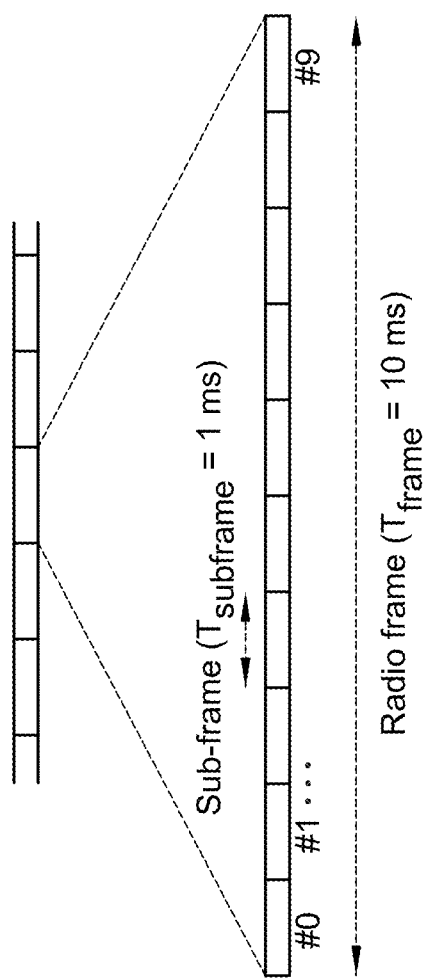
FIG. 3 illustrates an exemplary time-domain structure for an OFDM system.

In LTE systems, data is transmitted to the user terminals over a downlink transport channel known as the Physical Downlink Shared Channel (PDSCH). The PDSCH is a time and frequency multiplexed channel shared by a plurality of user terminals. As shown in FIG. 3, the downlink transmissions are organized into 10 ms radio frames. Each radio frame comprises ten equally-sized subframes. For purposes of scheduling users to receive downlink transmissions, the downlink time-frequency resources are allocated in units called resource blocks (RBs). Each resource block spans twelve subcarriers (which may be adjacent or distributed across the frequency spectrum) and one 0.5 ms slot (one half of one subframe). The term "resource block pair" refers to two consecutive resource blocks occupying an entire one millisecond subframe.

The base station 20 dynamically schedules downlink transmissions to the user terminals based on channel state and quality information (CSI, CQI) reports from the user terminals on the Physical Uplink Control Channel (PUCCH) or Physical Uplink Shared Channel (PUSCH). The CQI and CSI reports indicate the instantaneous channel conditions as seen by the receiver. In each subframe, the base station 20 transmits downlink control information (DCI) identifying the user terminals that have been scheduled to receive data (hereinafter the scheduled terminals) in the current downlink subframe and the resource blocks on which the data is being transmitted to the scheduled terminals. The DCI is typically transmitted on the Physical Downlink Control Channel (PDCCH) in the first 1, 2, or 3 OFDM symbols in each subframe.

Hybrid Automatic Repeat Request (HARQ) is used to mitigate errors that occur during transmission of data on the downlink. When the base station 20 indicates that a user terminal 100 is scheduled to receive a transmission on the PDSCH, the user terminal 100 decodes the PDSCH and transmits an acknowledgement (ACK/NACK message to base station 20 on the PUCCH or PUSCH. The acknowledgement message informs the base station 20 whether the data packet was correctly received by the user terminal 100. The acknowledgement message could be either a positive acknowledgement (ACK) indicating a successful decoding or a negative acknowledgement (NACK) message indicating a decoding failure. Based on the acknowledgement message received from the user terminal 100, base station 20 determines whether to transmit new data (ACK received) or to retransmit the previous data (NACK received).

For uplink transmissions, the user terminals transmit scheduling requests (SRs) to the base station 20 on the PUCCH when the user terminals have data to send but no valid uplink grant. The base stations 20 allocate uplink resources responsive to the scheduling requests and transmit a scheduling grant to the user terminal 100 on the PDCCH. When the data is received, the base station 20 transmits ACK/NACK signaling to the user terminal 100 on the Physical Hybrid Automatic Repeat Request Indicator Channel. (PHICH) to indicate whether the data is received correctly.

Figure 4:
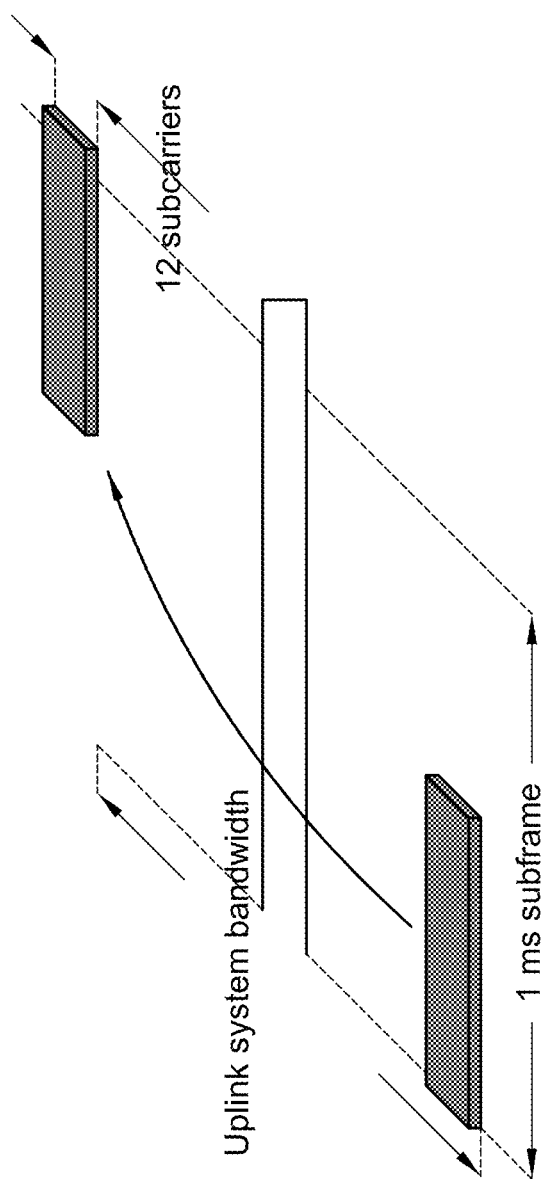
FIG. 4 illustrates uplink L1/L2 control signaling transmission on PUCCH.

If the user terminal 100 has not been assigned an uplink resource for data transmission, the L1/L2 control information (CQI reports, ACK/NACKs, and SRs) is transmitted in uplink resources (resource blocks) specifically assigned for uplink transmission of L1/L2 control information on the Physical Uplink Control Channel (PUCCH). As illustrated in FIG. 4, these resources are located at the edges of the total available cell bandwidth. Each PUCCH resource comprises of one resource block (twelve subcarriers) within each of the two slots of an uplink subframe. Frequency hopping is used to provide frequency diversity. The frequency of the resource blocks alternate at the slot boundary, with one resource block at the upper part of the spectrum within the first slot of a subframe and an equally sized resource block at the lower part of the spectrum during the second slot of the subframe, or vice versa. If more resources are needed for the uplink L1/L2 control signaling, e.g., in case of very large overall transmission bandwidth supporting a large number of users, additional resources blocks can be assigned adjacent the previously assigned resource blocks.

The reasons for locating the PUCCH resources at the edges of the overall available spectrum are two-fold. First, the allocation maximizes the frequency diversity, particularly when frequency hopping is employed. Second, the allocation avoids fragmentation of the uplink spectrum, which would make it impossible to assign very wide transmission bandwidths to a single user terminal 100 and still retain the single-carrier property of the uplink transmission.

The bandwidth of one resource block during one subframe is too large for the control signaling needs of a single user terminal 100. Therefore, to efficiently exploit the resources set aside for control signaling, multiple user terminals can share the same resource block. This is done by assigning the different terminals different orthogonal phase rotations of a cell-specific length-12 frequency-domain sequence. A linear phase rotation in the frequency domain is equivalent to applying a cyclic shift in the time domain. Thus, although the term "phase rotation" is used herein, the term cyclic shift is sometimes used with an implicit reference to the time domain.

The resource used by a PUCCH is therefore not only specified in the time-frequency domain by the resource-block pair, but also by the phase rotation applied. Similarly to the case of reference signals, there are up to twelve different phase rotations specified in the LTE standard, providing up to twelve different orthogonal sequences from each cell-specific sequence. However, in the case of frequency-selective channels, not all the twelve phase rotations can be used if orthogonality is to be maintained. Typically, up to six rotations are considered usable in a cell.

There are two message formats defined for transmission of control information on the PUCCH, each capable of carrying a different number of bits. A user terminal 100 uses PUCCH format 1 to transmit HARQ acknowledgements and scheduling requests. For CQI reporting, the user terminal 100 uses PUCCH format 2.

Figure 5:
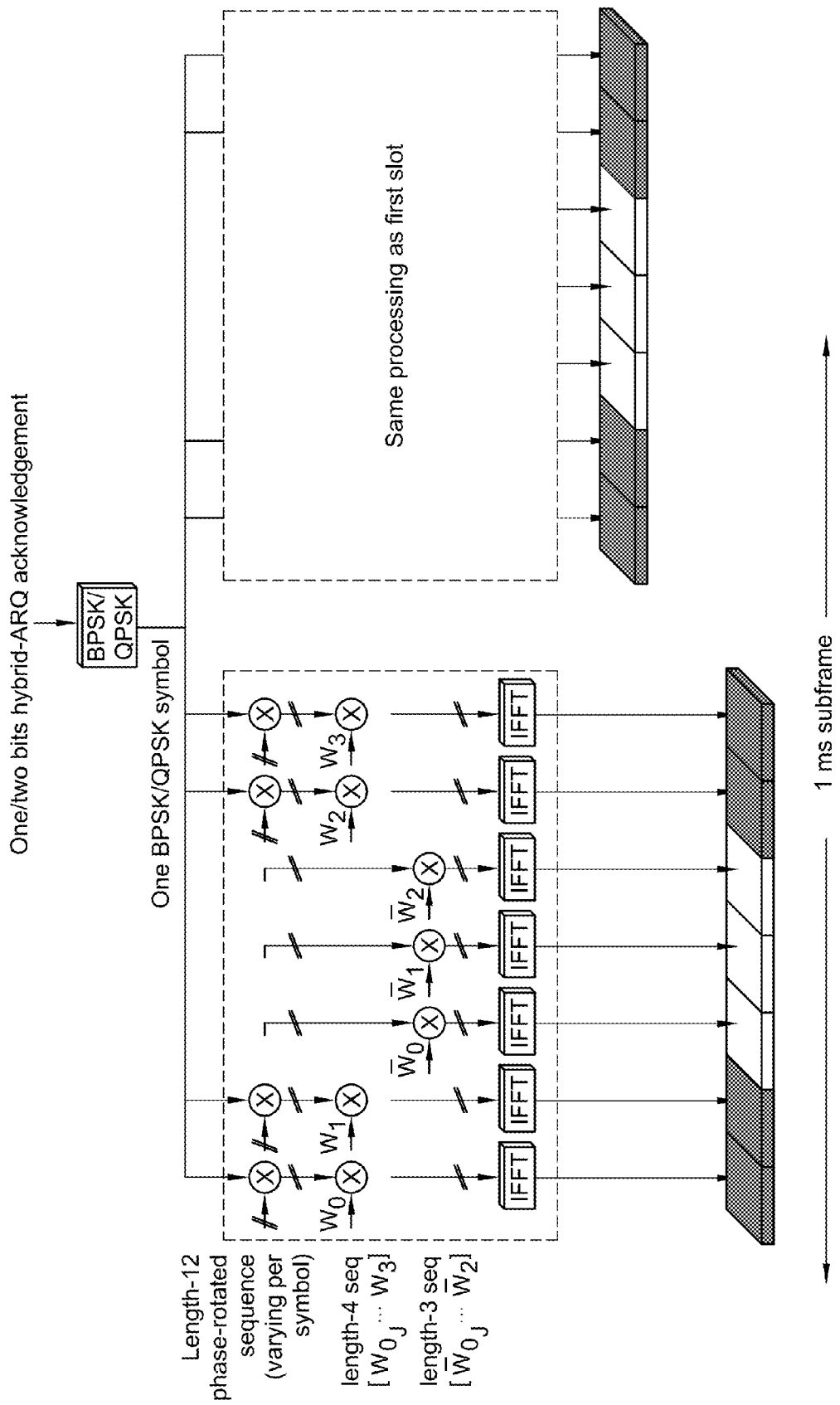
FIG. 5 illustrates the PUCCH format 1 using a normal cyclic prefix.

Hybrid-ARQ acknowledgements are used to acknowledge the reception of one (or two in case of spatial multiplexing) transport blocks in the downlink. Scheduling requests are used to request resources for uplink data transmission. A scheduling request is transmitted only when the user terminal 100 is requesting resources, otherwise the user terminal 100 stays silent in order to save battery resources and not create unnecessary interference. For scheduling requests, no explicit information bit is transmitted. Instead, the user terminal requests uplink resources by the presence (or absence) of energy on the corresponding PUCCH. Although HARQ acknowledgements and scheduling requests serve different purposes, they share the same PUCCH format. This format is referred to as PUCCH format 1 in the specifications FIG. 5 illustrates the structure of a PUCCH format 1 message. The PUCCH format 1 uses the same structure in each of the two slots of a subframe. For transmission of a HARQ acknowledgement, the single HARQ acknowledgement bit is used to generate a BPSK symbol (in case of downlink spatial multiplexing the two acknowledgement bits are used to generate a QPSK symbol). For a scheduling request, on the other hand, the BPSK/QPSK symbol is replaced by a constellation point treated as negative acknowledgement at the base station 20. The modulation symbol is then used to generate the signal to be transmitted in each of the two PUCCH slots.

A PUCCH format 1 resource, used for either a HARQ acknowledgement or a scheduling request, is represented by a single scalar resource index. From the index, the phase rotation and the orthogonal cover sequence is derived. For HARQ transmission, the resource index to use for transmission of the HARQ acknowledgement is given implicitly by the DCI transmitted on the PDCCH to schedule the downlink transmission to the user terminal 100. Thus, the resources to use for an uplink HARQ acknowledgement vary dynamically and depend on the DCI used to schedule the user terminal 100 in each subframe.

In addition to dynamic scheduling based on the DCI transmitted by the base station on the PDCCH, it is also possible to semi-persistently schedule a user terminal 100 according to a specific pattern. In this case the configuration information indicating the semi-persistent scheduling pattern includes information on the PUCCH index to use for the HARQ acknowledgements. The configuration information also informs the user terminal 100 which PUCCH resources to use for transmission of scheduling requests.

The PUCCH resources are split into two parts: a semi-static part and a dynamic part. The semi-static part of the PUCCH resources is used for scheduling requests and HARQ acknowledgements from semi-persistent users. The amount of resources used for the semi-static part of PUCCH 1 resources does not vary dynamically. The dynamic part is used for dynamically scheduled user terminals. As the number of dynamically scheduled terminals varies, the amount of resources used for the dynamic PUCCHs varies.

Channel-status reports are used to provide the base station 20 with an estimate of the channel conditions as seen by the user terminal 100 in order to aid channel-dependent scheduling. A channel-status report consists of multiple bits per subframe. PUCCH format 1, which is capable of at most two bits of information per subframe, can not be used for this purpose. Transmission of channel-status reports on the PUCCH is instead handled by PUCCH format 2, which is capable of multiple information bits per subframe.

Figure 6:
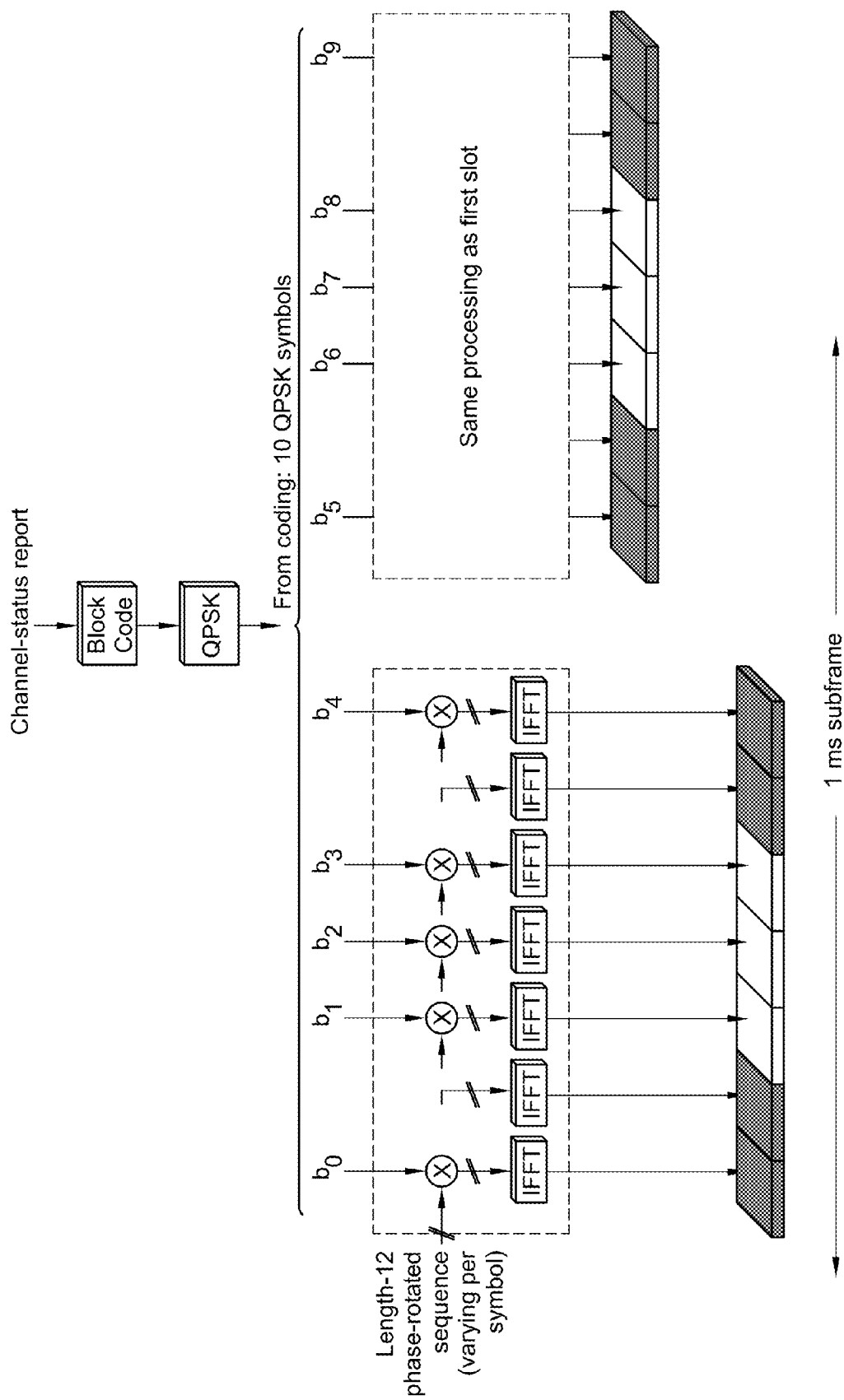
FIG. 6 illustrates the PUCCH format 2 using a normal cyclic prefix.

PUCCH format 2, illustrated for normal cyclic prefix in FIG. 6, is based on a phase rotation of the same cell-specific sequence as format 1. Similarly to format 1, a format 2 resource can be represented by an index from which the phase rotation and other quantities necessary are derived. The PUCCH format 2 resources are semi-statically configured.

Both PUCCH format 1 and format 2 signaling messages are transmitted on a resource-block pair with one resource block in each slot. The resource-block pair is determined from the PUCCH resource index. Thus, the resource-block number to use in the first and second slot of a subframe can be expressed as:

RBnumber(i)=f(PUCCH index,i)

where i is the slot number (0 or 1) within the subframe and f a function found in the specification.

Figure 7:
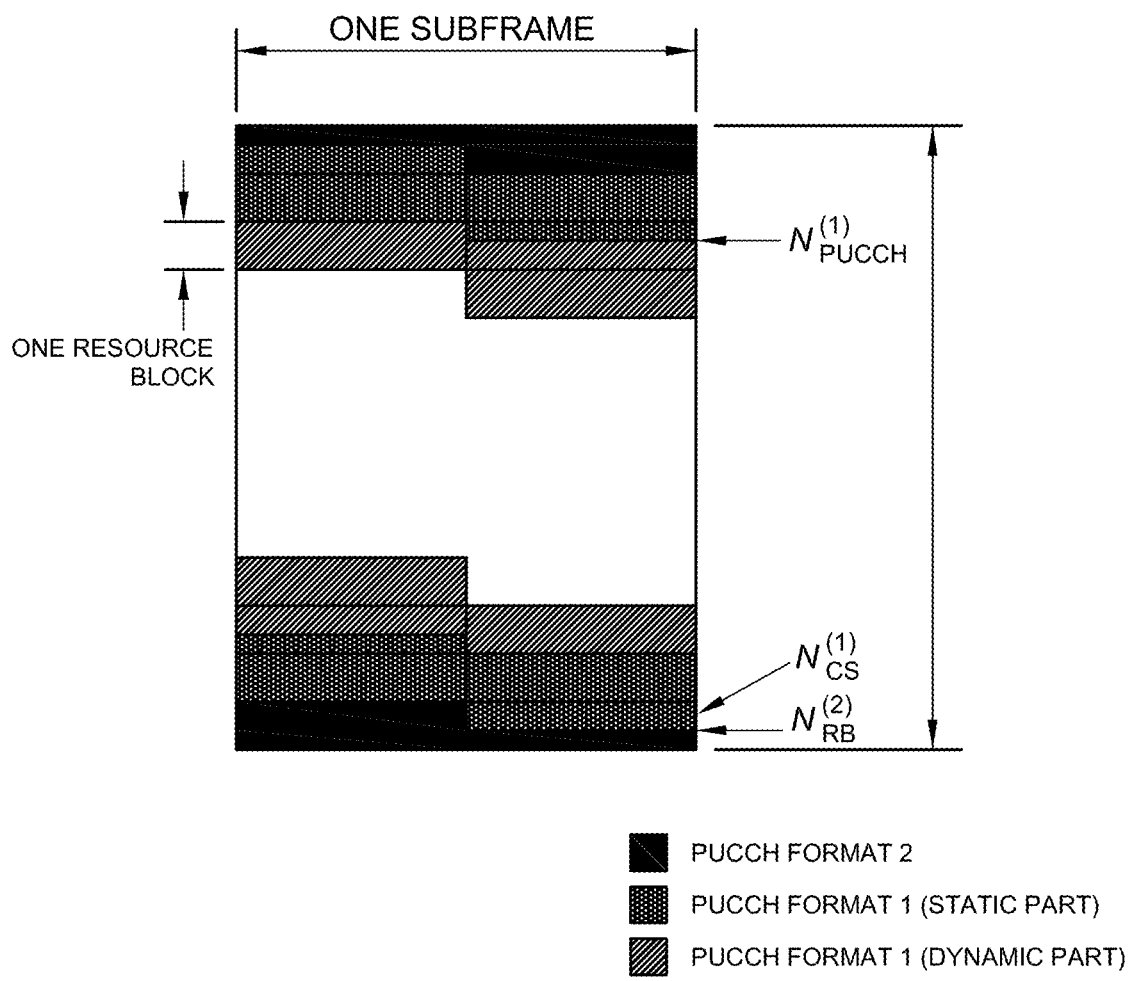
FIG. 7 illustrates an exemplary allocation of resource blocks for PUCCH.

Multiple resource-block pairs can be used to increase the control-signaling capacity. When one resource-block pair is full, the next PUCCH resource index is mapped to the next resource-block pair in sequence. The mapping is done such that PUCCH format 2 (channel-status reports) is transmitted closest to the edges of the uplink cell bandwidth with the semi-static part of PUCCH format 1 next and finally the dynamic part of PUCCH format 1 in the innermost part of the bandwidth as shown in FIG. 7.

Three semi-statically parameters are used to determine the resources to use for the different PUCCH formats:

$N_{RB}^{(2)}$, provided as part of the system information, controls on which resource-block pair the mapping of PUCCH format 1 starts $N_{PUCCH}^{(1)}$ controls the split between the semi-static and dynamic part of PUCCH format 1

$N_{CS}^{(1)}$ controls the mix of format 1 and format 2 in one resource block. In most cases, the configuration is done such that the two PUCCH formats are mapped to separate sets of resource blocks, but there is also a possibility to have the border between format 1 and 2 within a resource block.

Figure 8:
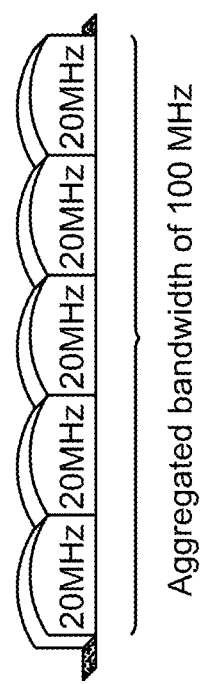
FIG. 8 illustrates the concept of carrier aggregation.

In order to support bandwidths greater than 20 MHz, carrier aggregation will be supported in LTE Rel 10. To maintain backward compatibility with Rel 8 user terminals 100, the available spectrum is divided into Rel-8 compatible component carriers (e.g., 20 Mhz component carriers) as shown in FIG. 8. A user terminal 100 can obtain bandwidth up to 100 MHz by transmitting on multiple component carriers. The use of multiple component carriers for data transmission is known as carrier aggregation.

The number of aggregated component carriers as well as the bandwidth of the individual component carrier may be different for Uplink (UL) and Downlink (DL). A symmetric configuration refers to the case where the number of component carriers in DL and UL are the same. An asymmetric configuration refers to the case where the number of component carriers is different for the UL and DL. The number of component carriers configured for a geographic cell area 12 may be different from the number of component carriers seen by the user terminal 100. A user terminal 100 may, for example, support more DL component carriers than UL component carriers, even though in the geographic cell area 12 the same number of UL and DL component carriers is offered by the network.

One consideration for carrier aggregation is how to configure the PUCCH for uplink control signaling from the user terminal. One solution is to transmit the uplink control information on multiple control channels on multiple UL component carriers. However, this option is likely to result in higher user terminal power consumption and a dependency on specific user terminal capabilities. It may also create implementation issues due to inter-modulation products, and may lead to generally higher complexity for implementation and testing.

According to some embodiments of the present invention, the PUCCH resources on a single uplink component carrier are used to support downlink transmissions on several downlink component carriers. With this approach, a user terminal 100 transmit HARQ signaling associated with downlink transmissions on two or more downlink component carriers on PUCCH resources on a single uplink component carrier. Similarly, a single uplink component carrier may be used to support uplink transmissions on several uplink component carriers. For example, a user terminal 100 may use PUCCH resources on a single uplink component carrier to request uplink resources on multiple uplink component carriers. The uplink component carrier on which PUCCH resources are used to support downlink or uplink transmissions on two or more component carriers is referred to herein as uplink primary component carrier (UL PCC) or uplink associated with the primary cell (PCell).

For HARQ signaling, a straight-forward approach would be to increase the PUCCH resources on the UL PCC for PUCCH format 1 by a factor of N, where N is the number of aggregated downlink component carriers supported.

However, consideration should be given to the typical expected use case. Not all user terminals 100 will be scheduled to receive downlink transmission on multiple downlink component carriers. The number of downlink component carriers used for transmission will be user terminal specific and will vary dynamically as user terminals 100 are scheduled. With bursty data-transmission, the number of user terminals 100 simultaneously assigned resources on several downlink carriers is expected to be rather small. Multiple downlink component carriers are only needed when there are not enough resources on a single component carrier, and there appears to be no benefits from assigning several smaller transport blocks on multiple downlink component carriers for a large number of user terminals 100. Therefore, the design of the ACK/NACK feedback on PUCCH should be optimized for a low number of simultaneous user terminals 100 with assignments on multiple downlink component carrier.

Considering that the typical use case is a rather small number of user terminals 100 simultaneously assigned resources on multiple downlink component carriers, increasing the overhead with a factor of N is probably not necessary. Rather, the amount of resources should be chosen in anticipation on the number of user terminals 100 that simultaneously are expected to have assignments on multiple downlink component carriers, which is expected to be scenario and implementation dependent. This could be achieved by configuring a set of uplink resources upon which the currently scheduled user terminal(s) 100 using multiple component carriers transmit the ACK/NACK feedback.

According to a first approach, a set of shared PUCCH resources of potentially configurable size, in addition to PUCCH resources according to LTE Rel-8, is allocated for HARQ acknowledgements by user terminals 100 which receive downlink assignments on multiple downlink component carriers. The resource set and/or the size of the resource set can be transmitted to the user terminal by Radio Resource Control (RRC) signaling. With this approach, the UL PCC contains PUCCH resources according to LTE Rel-8 for HARQ acknowledgements from user terminals 100 assigned resources for downlink transmission on a single downlink component carrier associated with the UL PCC. The shared PUCCH resource would be used by user terminals 100 which receive resource assignments for downlink transmission on multiple downlink component carriers. There may be some circumstances, such as retransmissions, when the user terminal 100 is assigned resources on a single downlink component carrier that is different from the downlink component carrier associated with the UL PCC. In such a case the shared set of PUCCH resources can also be used for such "cross-carrier" HARQ acknowledgements.

According to a second approach, a set of shared PUCCH resources of potentially configurable size, in addition to PUCCH resources according to LTE Rel-8, is allocated for HARQ acknowledgements by user terminals 100 which receive downlink assignments on at least one downlink component carrier other than the downlink component carrier having associated Rel-8 resources on the UL PCC. The resource set and/or the size of the resource set can be transmitted to the user terminal by RRC signaling.

With either of the above approaches, the set of shared PUCCH resources may be made visible to the user terminal 100 in the same way as for LTE Rel-8 user terminals 100, namely in the form of an association rule between the DL PDCCH CCE and index to PUCCH resource. Thus, from a system perspective, the two sets of PUCCH resources could overlap or be interleaved. In principle, a user terminal 100 could be configured with semi-static PUCCH resources for HARQ acknowledgements and then use these resources for HARQ acknowledgements in case of multiple DL component carrier assignments. By configuring all the user terminals 100 in the cell to have the same semi-static ACK/NACK resources, such a scheme would allow for assigning at most a single user terminal multiple DL component carrier at the same time. When there is no need for HARQ acknowledgements of multiple carriers, the resource could of course be used for data transmission. The user terminals 100 could select which shared PUCCH resources to use based on component carrier, DL PDDCH CCE, C-RNTI and other parameters. There is though a risk for collisions or scheduling constraints, and to reduce this, one could consider having a dynamic indicator to aid the selection of PUCCH resource. The dynamic indication allows managing the ACK/NACK resources more carefully which is of interest when the amount of resources reserved for HARQ acknowledgements is small and orthogonality is desired.

In one exemplary embodiment, semi-static PUCCH resources are reserved for user terminals 100 configured with multiple downlink component carriers. The assignment of PUCCH resources can be achieved by implicit indication of actual resource block, e.g., utilizing CCE index, number of the downlink component carriers, RNTI or a combination of these parameters. Alternatively, reserved PUCCH resources can be indicated explicitly via signaling to the user terminal 100 (e.g., RRC signaling), or by a combination of implicit and explicit signaling. Additionally, dynamic indication of PUCCH resources for HARQ acknowledgements can be done by using additional relative or explicit dynamic indication to select actual PUCCH resources out of the set of implicit/explicitly reserved (e.g., semi-statically reserved) resources. For example, the base station 20 may send as a control message or part of a control message, an indicator, referred to herein as an acknowledgement resource indication (ARI), comprising a single bit to indicate that the user terminal 100 should use the next available PUCCH resource or the next cyclically available PUCCH resource from the set of semi-statically reserved PUCCH resources. In some embodiments, the ARI may comprise the entire control message. In other embodiment, the ARI may be included as an information element in a larger control message. Alternatively, the base station 20 can send a multi-bit ARI to indicate the actual PUCCH resource out of the set of semi-statically reserved PUCCH resources.

There may be at least two different mappings to PUCCH resources on the UL PCC. A first resource mapping may be used for HARQ acknowledgements of downlink transmissions on a single designated downlink component carrier, and a second mapping for HARQ acknowledgements of downlink transmissions on at least one other downlink component carrier. The two mappings may be described by parameters, such as first resource and size of resource set that are configurable by means of higher layer signaling. The user terminal 100 may, based on the detected downlink assignments on one or several downlink component carriers, select one of the two mappings. In a preferred embodiment, the first mapping coincides with the Rel-8 mapping rules for ACK/NACK resources.

The user terminal 100 may, depending on the detected downlink assignments, and the downlink component carriers on which the downlink assignment was sent, select which mapping to use. Two approaches may be used by the user terminal 100 to select the mapping of radio resources for uplink control signaling. In the first approach, the user terminal 100 selects a first mapping if downlink assignment of a single downlink component carrier is detected and the downlink assignment is sent on the associated downlink component carrier. The user terminal 100 selects a second mapping if it detects at least one downlink assignment for at least one downlink component carrier different from the single associated downlink component carrier (for which there are Rel-8 ACK/NACK resources). In a second approach, the user terminal selects a mapping depending on the number of component carriers it detects for downlink assignments for downlink transmissions.

Figure 9:
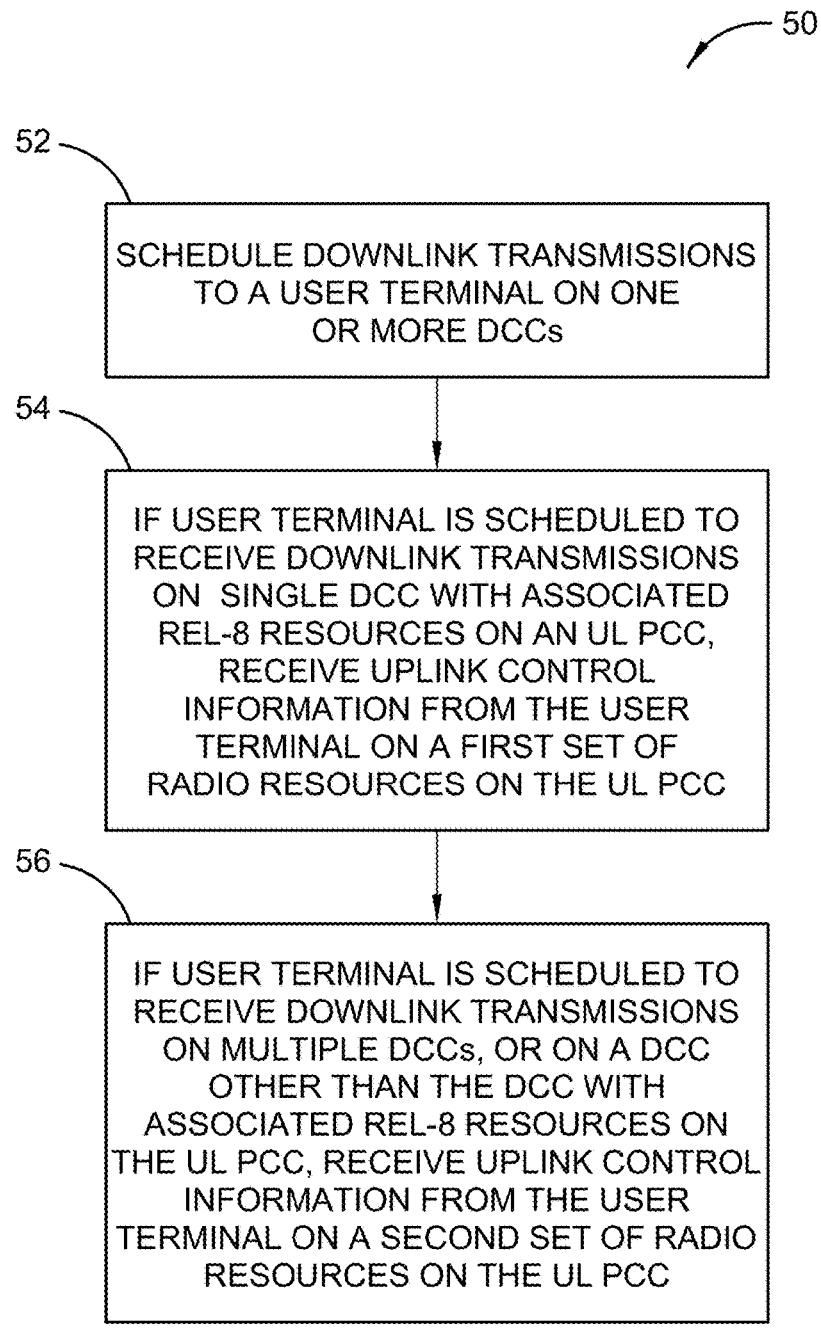
FIG. 9 illustrates an exemplary method implemented by a base station of receiving control information from user terminals scheduled on a single carrier and multiple carriers.

FIG. 9 illustrates an exemplary method 50 implemented by a base station 20 in a communication network 10 of receiving uplink control information from a user terminal 100 depending on the assignment of downlink component carriers. The base station 20 schedules the user terminal 100 to receive downlink transmissions on one or more downlink component carriers (block 52). The user terminal 100 may be scheduled to receive downlink transmissions on a single downlink component carrier associated with a primary uplink component carrier. In this case, the base station 20 receives control information associated with the downlink transmissions to the user terminal 100 on a first set of radio resources on the uplink primary component carrier (block 54). Alternatively, the user terminal 100 may be scheduled to receive downlink transmissions on multiple downlink component carriers, or on a single downlink component carrier other than the downlink component carrier associated with the uplink primary component carrier. In this alternative case, the base station 20 receives uplink control information associated with the downlink transmissions from the user terminal 100 on a second set of radio resources on the uplink component carrier (block 56).

Figure 10:
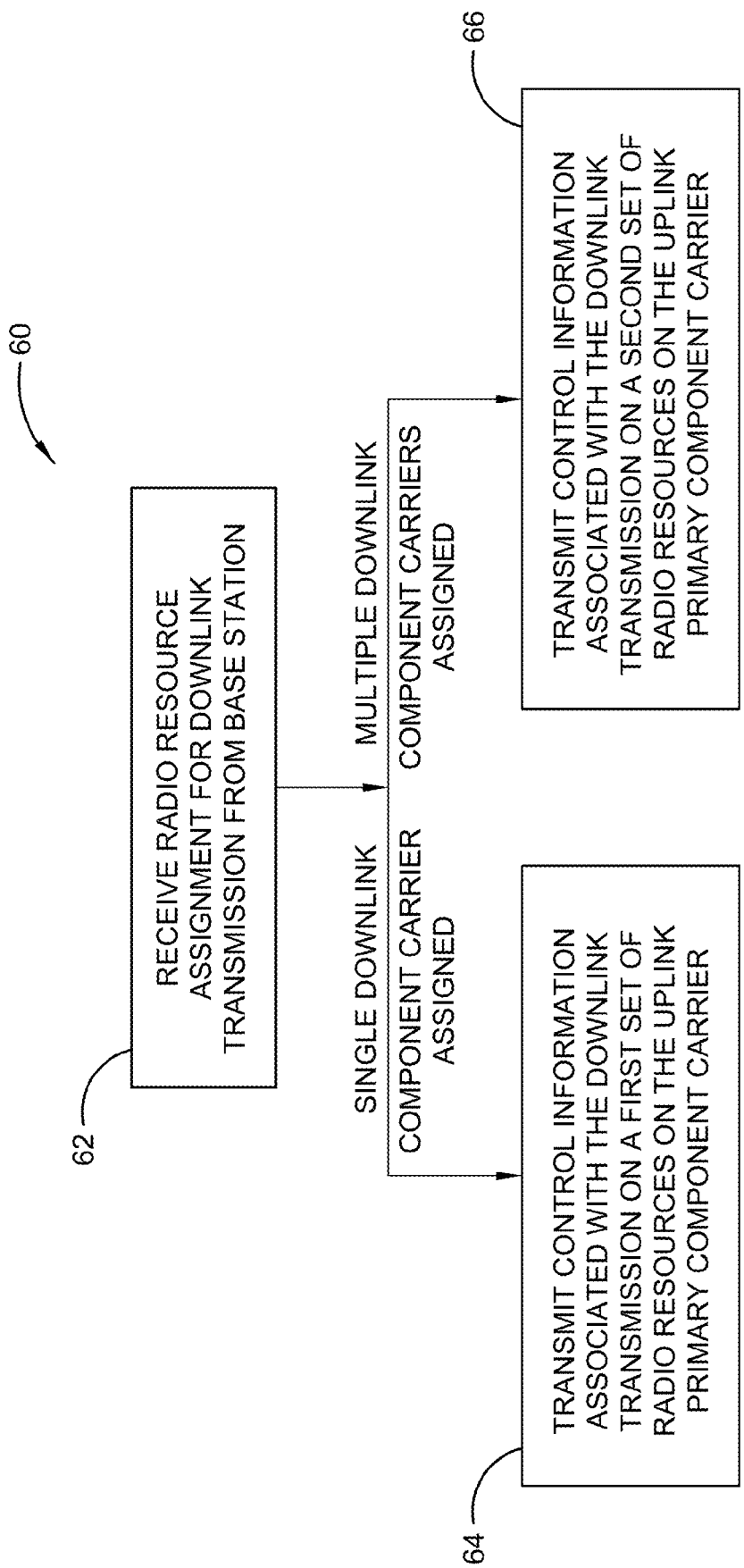
FIG. 10 illustrates an exemplary method implemented by a user terminal of signaling control information to a base station.

FIG. 10 illustrates an exemplary method 60 implemented by a user terminal of transmission of uplink control signaling to a base station 20. The user terminal 100 receives a radio resource assignment for a downlink transmission from the base station 20 (block 62). If the user terminal 100 detects assignments of radio resources for a single downlink component carrier, the user terminal 100 transmits, on a first set of radio resources on an uplink primary component carrier, uplink control information associated with the downlink transmissions (block 64). On the other hand, if the user terminal 100 receives assignments for multiple downlink component carriers, the user terminal 100 transmits, on a second set of radio resources on the uplink primary component carrier, uplink control information associated with downlink transmissions (block 66).

Figure 11:
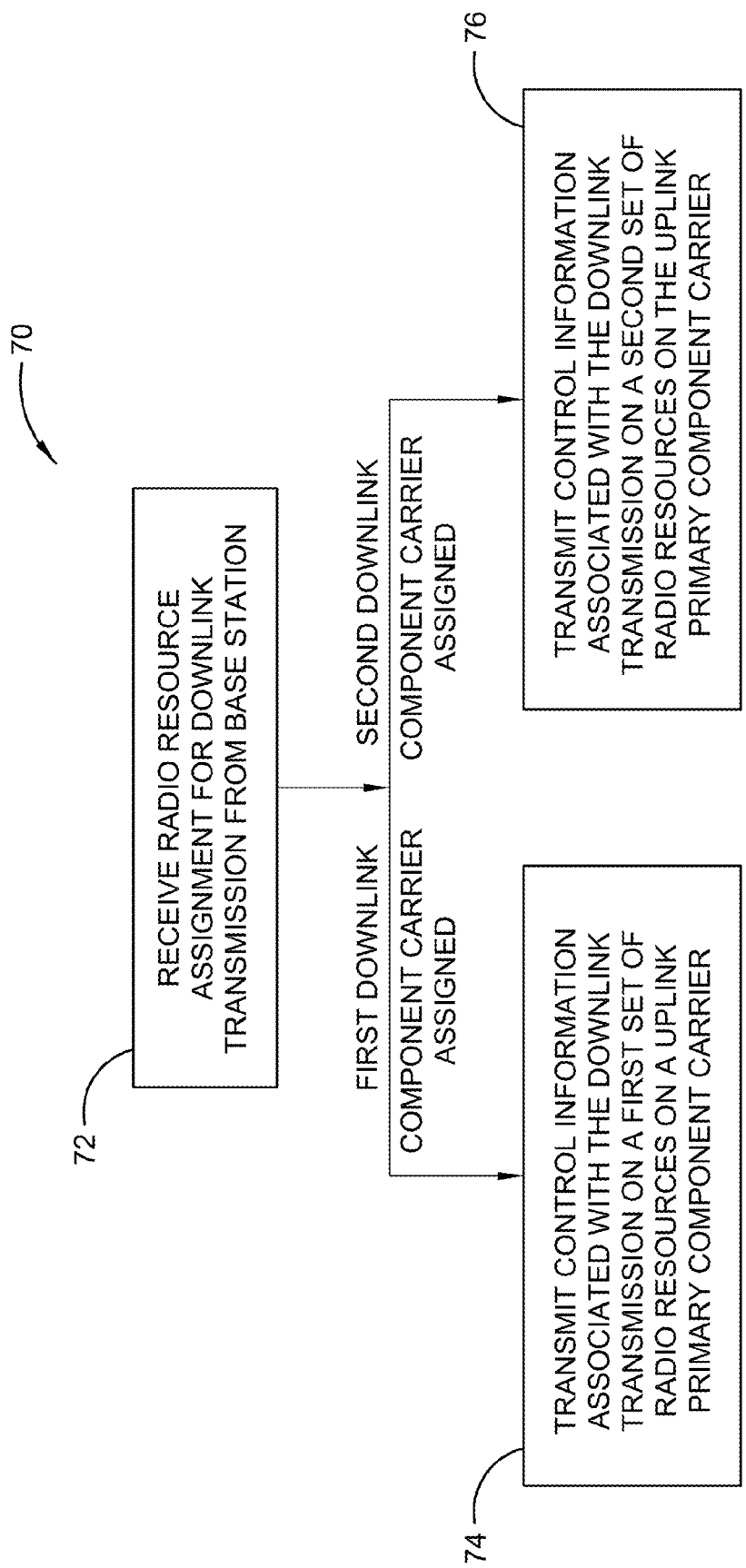
FIG. 11 illustrates another exemplary method implemented by a user terminal of signaling control information to a base station.

FIG. 11 illustrates another exemplary method 70 implemented by a user terminal 100 of transmission of uplink control signaling to a base station 20. The user terminal 100 receives a radio resource assignment for a downlink transmission from the base station 20 (block 72). If the user terminal 100 detects assignments of radio resources for a first downlink component carrier, the user terminal 100 transmits, on a first set of radio resources on a uplink primary component carrier, uplink control information associated with the downlink transmissions (block 74). On the other hand, if the user terminal 100 receives assignments for a second downlink component carrier, the user terminal 100 transmits, on a second set of radio resources on the primary uplink component carrier, uplink control information associated with downlink transmissions (block 76).

Figure 12:
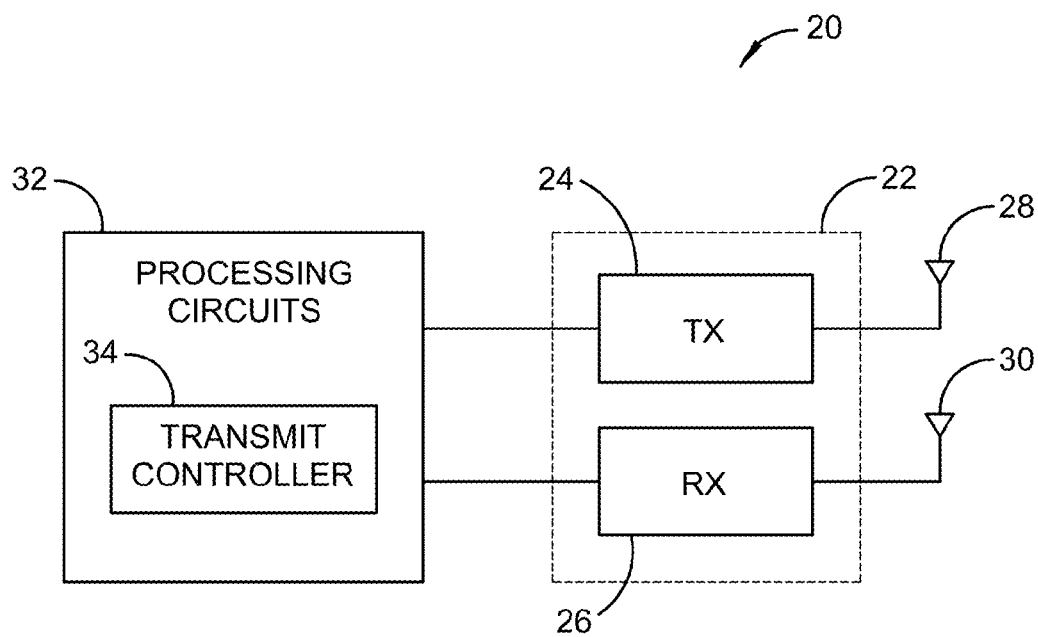
FIG. 12 illustrates an exemplary base station with a controller for controlling downlink transmissions by the base station to one or more user terminals and associated transmissions of uplink control information by the user terminals

FIG. 12 illustrates an exemplary base station 20 according to the present invention. The base station 20 comprises a transceiver 22 for communicating with user terminals and processing circuit 32 for processing the signals transmit and received by the transceiver 22. The transceiver 22 includes a transmitter 24 coupled to one or more transmit antennas 28 and receiver 26 coupled to one or more receive antennas 30. The same antenna(s) 28, 30 may be used for both transmission and reception. The processing circuit 32 may be implemented by one or more processors, hardware, firmware or a combination thereof. Typical functions of the processing circuit 32 include modulation and coding of transmitted signals, and the demodulation and decoding of received signals. The processing circuit 32 also includes a controller 34 for controlling the operation of the base station 20. The controller 34 is responsible for transmission of downlink control information on the PDCCH, and for the processing of uplink control information received on the PUCCH.

Figure 13:
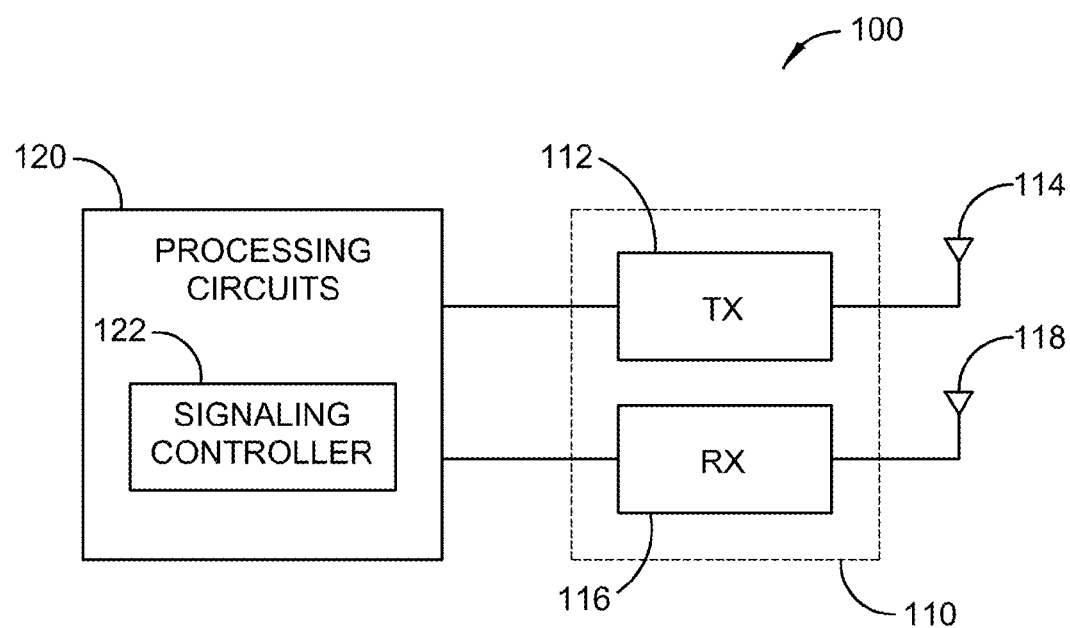
FIG. 13 illustrates an exemplary user terminal with a controller for controlling transmission of uplink control information to a base station.

FIG. 13 illustrates a functional block diagram of an exemplary user terminal 100. The user terminal 100 comprises a transceiver 110 and a processing circuit 120. The transceiver 110 comprises a transmitter 112 coupled to one or more transmit antennas 114, and a receiver 116, coupled to one or more receive antennas 118. Those skilled in the art will appreciate that the same antennas may be used for transmission and reception. The processing circuit 120 processes signals transmitted and received by the transceiver 110. The processing circuit 120 comprises one or more processors, hardware, firmware, or a combination thereof. Typical functions of the processing circuit 120 include modulation end coding of transmitted signals, and the demodulation and decoding of received signals. The processing circuit 120 includes a controller 122 for controlling uplink transmissions and the reception of downlink transmissions. The controller 122 generates uplink control information for transmission on the PUCCH, and processes downlink control information received on the PDCCH as previously described.

The invention provides means for efficient transmission of PUCCH on one component carrier corresponding to multiple downlink component carriers, without creating implementation problems in the user terminal or being over-dimensioned and therefore inefficient.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method implemented by a base station of receiving control information from a user terminal, the method comprising:
   scheduling downlink transmissions to said user terminal on one or more downlink component carriers; and
   when the user terminal is scheduled to receive downlink transmissions on a first single downlink component carrier, receiving Hybrid Automatic Repeat Request, HARQ, acknowledgments associated with the downlink transmissions to the user terminal on a first set of radio resources on an uplink primary component carrier associated with said first downlink component carrier;
   when the user terminal is scheduled to receive downlink transmissions on a second single downlink component carrier, which is different from the first downlink component carrier associated with the uplink primary component carrier, or on multiple downlink component carriers, receiving HARQ acknowledgments associated with the downlink transmissions to the user terminal on a second set of radio resources on the uplink primary component carrier; and
wherein the second set of resources is assigned to the user terminal by a dynamic indication selecting actual uplink resources out of semi-statically reserved uplink resources.

2. The method of claim 1, wherein the semi-statically reserved uplink resources are reserved for user terminals in the cell which are configured with any single downlink component carrier which is different from the first downlink component carrier associated with the uplink primary component carrier or are configured with multiple downlink component carriers.

3. The method of claim 1, further comprising transmitting control information to the user terminal on a downlink component carrier to implicitly or explicitly indicate the first set of radio resources on the uplink primary component carrier.

4. The method of claim 1, further comprising transmitting the dynamic indication to the user terminal on a downlink component carrier to implicitly indicate the second set radio resources on the uplink primary component carrier.

5. The method of any one of claim 1, wherein at least one of the first and second sets of radio resources are indicated explicitly by an uplink control channel index.

6. The method of claim 1, wherein the dynamic indication is an acknowledgement resource indication transmitted on a downlink component carrier.

7. A base station comprising:
a transmitter to transmit user data on one or more downlink component carriers to a user terminal;
a controller to schedule downlink transmissions to the user terminal on one or more downlink component carriers; and
a receiver to receive Hybrid Automatic Repeat Request, HARQ, acknowledgements, the receiver configured to:
when the user terminal is scheduled to receive downlink transmissions on a first single downlink component carrier, to receive HARQ acknowledgements associated with the downlink transmissions to the user terminal on a first set of radio resources on a uplink primary component carrier associated with said first downlink component carrier;
when the user terminal is scheduled to receive downlink transmissions on a second single downlink component carrier, which is different from the first downlink component carrier associated with the uplink primary component carrier, or on multiple downlink component carriers, to receive HARQ acknowledgments associated with the downlink transmissions to the user terminal on a second set of radio resources on the uplink primary component carrier; and
wherein the controller is configured to assign the second set of resources to the user terminal by a dynamic indication selecting actual uplink resources out of semi-statically reserved uplink resources.

8. A method implemented by a user terminal of transmitting control information to a base station, the method comprising:
receiving an assignment of radio resources for downlink transmissions from the base station; and
when the assignment pertains to radio resources on a first single downlink component carrier, transmitting Hybrid Automatic Repeat Request, HARQ, acknowledgements associated with the downlink transmissions on a first set of radio resources on a primary uplink component carrier associated with said first downlink component carrier;
when the assignment pertains to radio resources on a second single downlink component carrier, which is different from the first downlink component carrier associated with the uplink primary component carrier, or on multiple downlink component carriers, transmitting HARQ acknowledgements associated with the downlink transmissions on a second set of radio resources on the uplink primary component carrier; and
wherein the second set of resources is assigned to the user terminal by a dynamic indication selecting actual uplink resources out of semi-statically reserved uplink resources.

9. The method of claim 8, wherein the semi-statically reserved uplink resources are reserved for user terminals in the cell which are configured with any single downlink component carrier which is different from the first downlink component carrier associated with the uplink primary component carrier or are configured with multiple downlink component carriers.

10. The method of claim 8, further comprising transmitting user data on the second set of radio resources if the assignment pertains to a single downlink component carrier.

11. The method of claim 8, further comprising receiving the dynamic indication from the base station on a downlink component carrier implicitly indicating the second set of radio resources on the uplink primary component carrier.

12. The method of any one of claim 8, wherein at least one of the first and second sets of radio resources are indicated explicitly by an uplink control channel index.

13. The method of claim 8, wherein the dynamic indication is an acknowledgement resource indication transmitted on a downlink component carrier.

14. A user terminal comprising:
a receiver to receive downlink transmissions on one or more downlink component carriers from a base station;
a transmitter to transmit Hybrid Automatic Repeat Request, HARQ, acknowledgements associated with the downlink transmissions to the base station; and
a controller to select radio resources for transmission of HARQ acknowledgments associated with the downlink transmissions, the controller configured to:
select a first set of radio resources on a primary uplink component carrier when an assignment of a first single downlink component carrier for the downlink transmission is received, wherein the primary uplink component carrier is associated with the first downlink component carrier;
select a second set of radio resources on the uplink component carrier when an assignment of radio resources on a second single downlink component carrier, which is different from the first downlink component carrier associated with the uplink primary component carrier, or on multiple downlink component carriers for the downlink transmission is received; and
wherein the controller is configured to receive an assignment of the second set of resources to the user terminal by a dynamic indication selecting actual uplink resources out of semi-statically reserved uplink resources.

* * * * *